(12) United States Patent
Khamharn

(10) Patent No.: US 8,818,275 B2
(45) Date of Patent: Aug. 26, 2014

(54) ENHANCING VEHICLE INFOTAINMENT SYSTEMS BY ADDING REMOTE SENSORS FROM A PORTABLE DEVICE

(75) Inventor: Oddy N. Khamharn, Grayslake, IL (US)

(73) Assignee: Continental Automotive Systems, Inc, Auburn Hills, MI (US)

( * ) Notice: Subject to any disclaimer, the term of this patent is extended or adjusted under 35 U.S.C. 154(b) by 273 days.

(21) Appl. No.: 13/044,904

(22) Filed: Mar. 10, 2011

(65) Prior Publication Data
US 2012/0231738 A1     Sep. 13, 2012

(51) Int. Cl.
*H04B 7/00* (2006.01)
*G06F 13/10* (2006.01)

(52) U.S. Cl.
CPC .................................. *G06F 13/105* (2013.01)
USPC ............................. 455/41.2; 455/90.2; 455/99

(58) Field of Classification Search
USPC ........... 455/41.2, 90.2, 99, 550.1, 556.1, 557, 455/566, 569.2, 575.9
See application file for complete search history.

(56) References Cited

U.S. PATENT DOCUMENTS

| 7,283,850 | B2 * | 10/2007 | Granovetter et al. | 455/570 |
|---|---|---|---|---|
| 2010/0220250 | A1 * | 9/2010 | Vanderwall et al. | 348/837 |
| 2010/0267336 | A1 * | 10/2010 | Maekawa | 455/41.2 |
| 2012/0065815 | A1 | 3/2012 | Hess | |

FOREIGN PATENT DOCUMENTS

EP   1885107 A1   2/2008

OTHER PUBLICATIONS

Dan Frommer, "15 Things You Can Remote Control With Your iPhone" URL:http://www.businessinsider.com/15-things-you-can-remote-control-with-your-iphone-2009-7, Jul. 21, 2009, the whole document, XP55025600, retrieved from the internet on Apr. 25, 2012.
Michael Eichhorn et al, "A SOA-based middleware concept for in-vehicle service discovery and device integration", Jun. 21, 2010, pp. 663-669, XP031732138, ISBN: 978-1-4244-7866-8, Intelligent Vehicles Symposium (IV) 2010 IEEE, IEEE, Piscataway NJ, USA.
Jan Sonnenberg, "A distributed in-vehicle service architecture using dynamically created web Services", Jun. 7, 2010, pp. 1-5, XP031716432, ISBN: 978-1-4244-6671-9, Consumer Electronics (ISCE), 2010 IEEE 14th International Symposium On, IEEE, Piscataway, NJ, USA.
International Search Report and Written Opinion dated May 7, 2012, from corresponding International Patent Application No. PCT/US2012/023162.
http://www.tuaw.com/2009/10/19/touchpad-turns-your-iphone-into-a-remote-keyboard-and-mouse/.
http://edovia.com/tpvncconnect.

* cited by examiner

*Primary Examiner* — Tuan H Nguyen

(57) ABSTRACT

A vehicle display device is provided with a communications interface, which couples the vehicle display device to portable input devices inside the vehicle. The portable input devices are thus provided with the ability to control the display device and what is displayed thereon. The communications interface also enables the portable input device to control vehicle subsystems such as a climate control system, entertainment system and the like. Portable input devices equipped with sensors have sensor-generated information displayed on the vehicle display device.

16 Claims, 3 Drawing Sheets

ENHANCING VEHICLE INFOTAINMENT SYSTEMS BY ADDING REMOTE SENSORS FROM A PORTABLE DEVICE

BACKGROUND

Vehicle manufacturers are equipping many of their vehicle infotainment systems with dashboard mounted display devices. Some of them have pressure-sensitive display, while others do not.

With the convergence of consumer and automotive environments, vehicle manufacturers are trying to incorporate consumer-related applications into their vehicles. These applications are much like the applications designed for a smart phone that rely on capacitive touch screen and sensors embedded in the phone to interact with the applications.

A problem with prior art infotainment systems is that the display devices used with them might not be touch sensitive. Displays which are touch sensitive may not have capacitive touch functionality. Moreover, a dashboard-mounted display might be out of reach from the driver's seat, preventing a driver from interacting with the display by touch.

Some vehicles that have infotainment systems might not have the sensors built in the vehicle required for the applications to work. Vehicles that have already been shipped and not designed for these applications cannot be retrofitted easily or cost-effectively because they would need to add the sensors and/or touch screen input devices.

An apparatus that can overcome the shortcomings of existing infotainment systems would be an improvement over the prior art.

DETAILED DESCRIPTION

Figure 1:
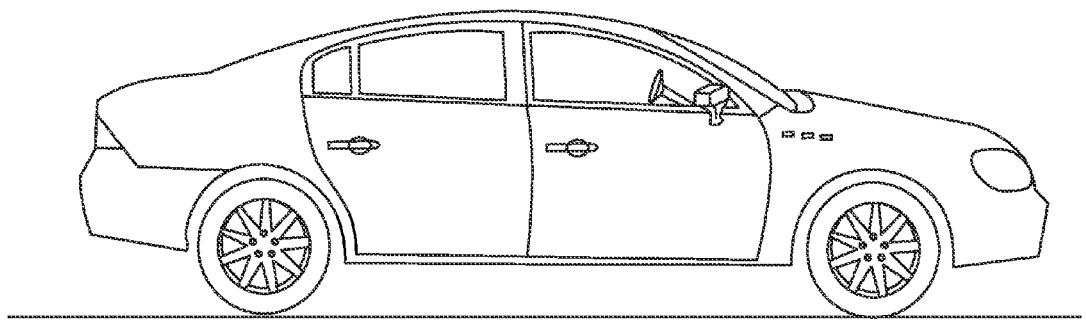
FIG. 1 is a depiction of a motor vehicle.
Figure 2:
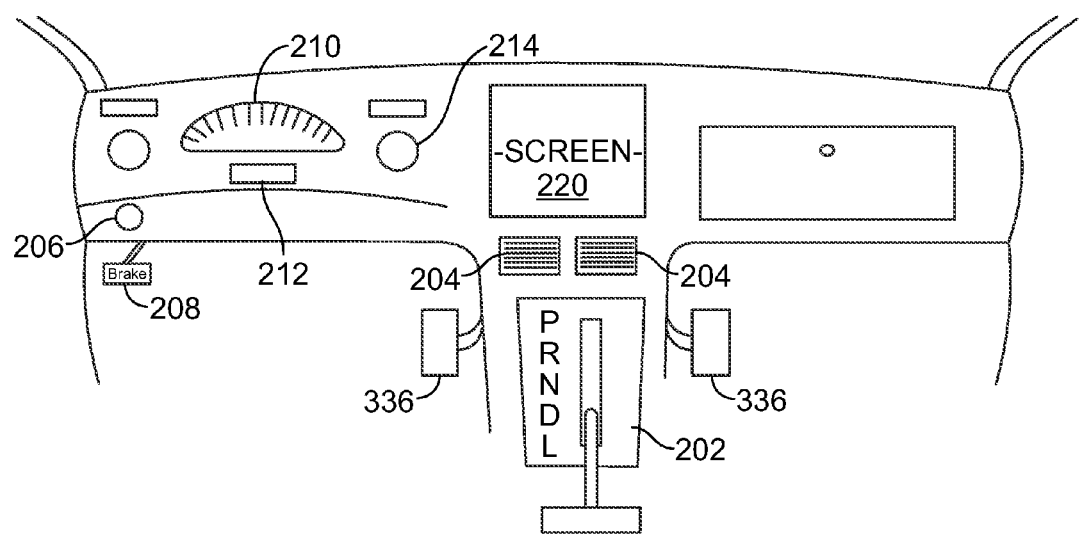
FIG. 2 depicts a dashboard of a motor vehicle.

FIG. 1 is an elevation view of a vehicle 100. As shown in FIG. 2, the vehicle 100 has a dashboard 200 comprised of various controls and displays. The controls include a transmission shift lever 202, air conditioning outlet vents 204, a headlight control switch 206, a parking brake release lever 208 amongst others not shown. The displays include a speedometer 210, a transmission quadrant indicator 212, a fuel gage 214 and a display screen 220 amongst others.

The display screen 220 is preferably embodied as a back-lit liquid crystal display having a pressure-sensitive membrane, not visible in FIG. 2, by which icons or softkeys displayed on the screen under computer control can be actuated using techniques and methods well-known in the art.

A problem with pressure sensitive or resistive screens used in the prior art is that they are only able to detect one finger of a user at a time. Such screens are generally used for the display of softkeys and icons the actuation of which controls a vehicle function as would otherwise take place by a switch closure.

Many vehicles are now manufactured with entertainment systems. These systems can include global positioning systems (GPS), video players and display devices, and wireless communications devices. Many of the functions or components in such multi-media systems would be easier to control using a capacitive touch screen, such as those found on portable computer devices that include tablet, personal computers such as the iPad® and in virtually every so called smart phone.

Figure 3:
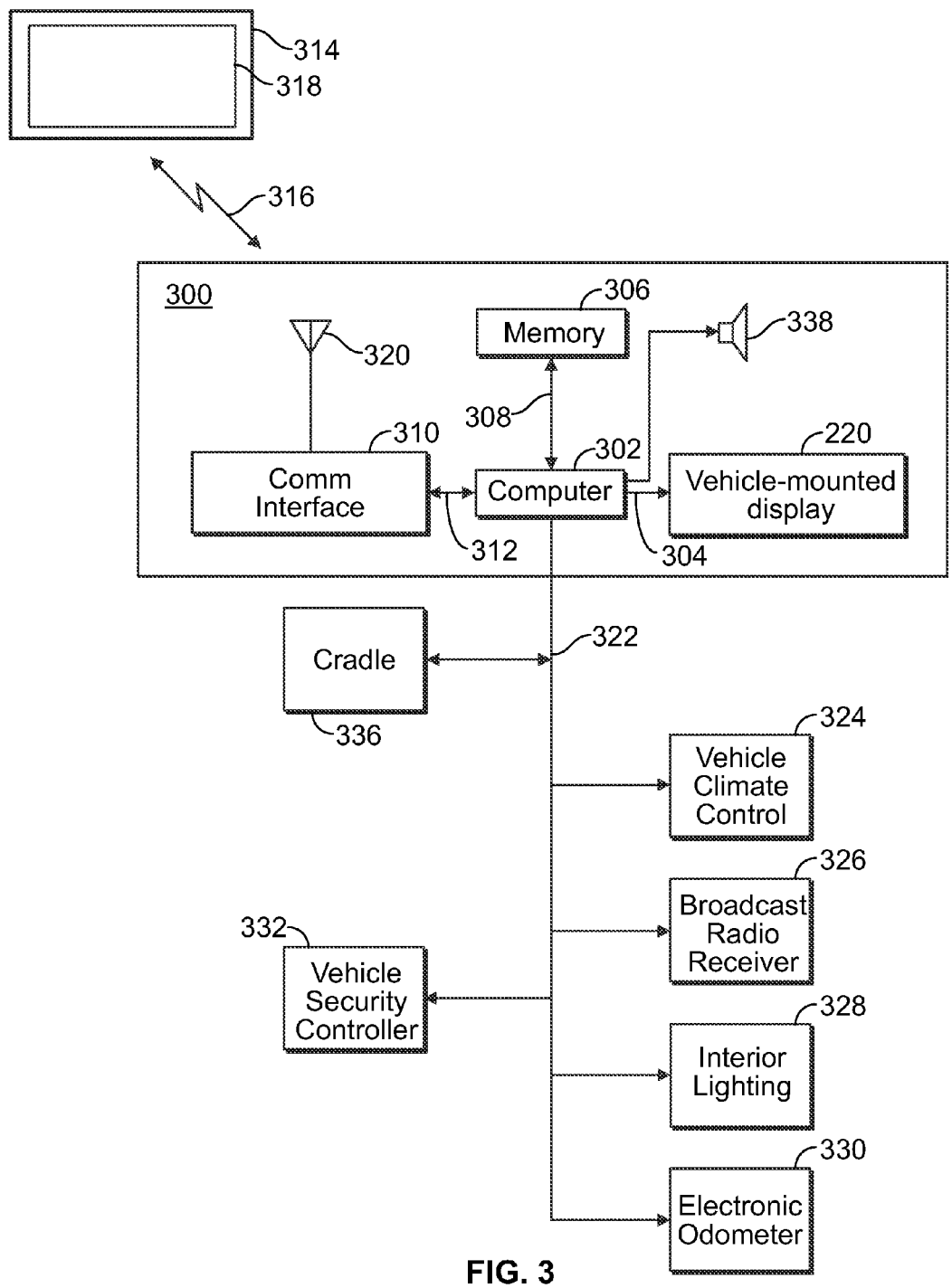
FIG. 3 is a block diagram of an apparatus configured to receive control signals from a remote, hand-held communications device.

FIG. 3 is a block diagram of an apparatus 300 for a vehicle 100, the apparatus 300 providing a control link between a multi-media system in a vehicle and having a display device 220 and a remote located, hand-held input device.

The apparatus 300 in FIG. 3 is comprised of the aforementioned vehicle-mounted display device 220. The display device 220 is coupled to a computer 302 by a display bus 304. The computer 302 executes program instructions stored in a memory device 306. The memory device 306 is depicted in FIG. 3 as being coupled to the computer 302 via a bus 308 however, the memory 306 and the computer 302 can be co-resident on the same silicon die, as those of ordinary skill in the art will recognize. FIG. 3 depicts a communications interface 310. The communications interface 310 is couple to the computer 302 via a control bus identified by reference numeral 312.

The computer 302 reads program instructions stored in the memory 306 and executes those instructions. The program instructions in the memory 306 cause the computer 302 to perform a variety of functions including displaying various images on the display device 220 but also to communicate with the communications interface 310. The communications interface 310 is configured to provide to the computer 302 via the bus 312 information-bearing signals that the communications interface 310 receives from one or more portable input devices one of which is shown in FIG. 3 and identified by reference numeral 314.

In one embodiment, the portable input device 314 is a smart phone, such as the iPhone® which is comprised of a capacitive touch screen but which is also provided with radio communications equipment by which an information bearing radio frequency signal 316 can be sent to the apparatus 300 from the portable input device 314. In one embodiment, the portable input device 314 and the communications interface 310 are configured to communicate with each other using these so called Bluetooth communications standard or derivatives thereof. In another embodiment, the portable input device 314 and the communications interface 310 communicate with each other with one or more communications standards published by the Institute for Electrical and Electronics Engineers (I.E.E.E.) 802.11(a),(b),(g),(n) and derivatives thereof.

Programs executing on the portable input device 314 are already in existence that recognize tactile inputs to a display screen 318 on the portable input device 314. The inputs to the display screen 318 include but are not limited to gestures using two fingers by which the image displayed on the screen 318 can be enlarged or magnified, scrolled or reduced in size. Other inputs to the display screen 318 and which are supported by existing applications include handwriting recognition. Existing applications executed on the portable input device 314 imbue the display screen 318 with characteristics identical or substantially identical to the capacitive touch pads commonly found on laptop computers. Such pads include the ability to scroll and execute "clicks" by a user placing a fingertip or other object against the display screen 318 sliding it along the screen surface and tapping the screen service respectively.

Radio frequency communications equipment inside the portable input device 314 and well-known to those of ordinary skill in the art, transmit information-bearing radio frequency signals 316 to an antenna 320 within the apparatus 300. Signals received at the antenna 320 are recovered by the communications interface 310. Information in the radio frequency signals 316 is recovered and forwarded to the computer 302 via the bus 312. The computer 302 then interprets the commands entered at the display screen 318 and actuates the vehicle-mounted display device 220 accordingly.

FIG. 3 shows that the computer 302 is connected to another bus identified by reference numeral 322. The bus 322 is a vehicle bus network, known to some in the art as a controller area network. The vehicle bus network 322, like any other bus which is a set of parallel conductors in a computer system that form a main transmission path, the vehicle bus network 322 couples the computer 302 to one or more vehicle components that are controlled or controllable by the computer.

The vehicle components that are controlled by the computer as depicted in FIG. 3 include a vehicle climate control system 324. In other embodiments, the apparatus 300 and the computer 302 are coupled to a broadcast radio receiver 326 which is controlled by the computer 302. Interior lighting modules 328, an electronic odometer 330, a vehicle security system 332 and in some embodiments a driver's seat controller 334 are coupled to the vehicle bus network 322 and therefore controllable through inputs to the vehicle-mounted display 220.

Figure 4:
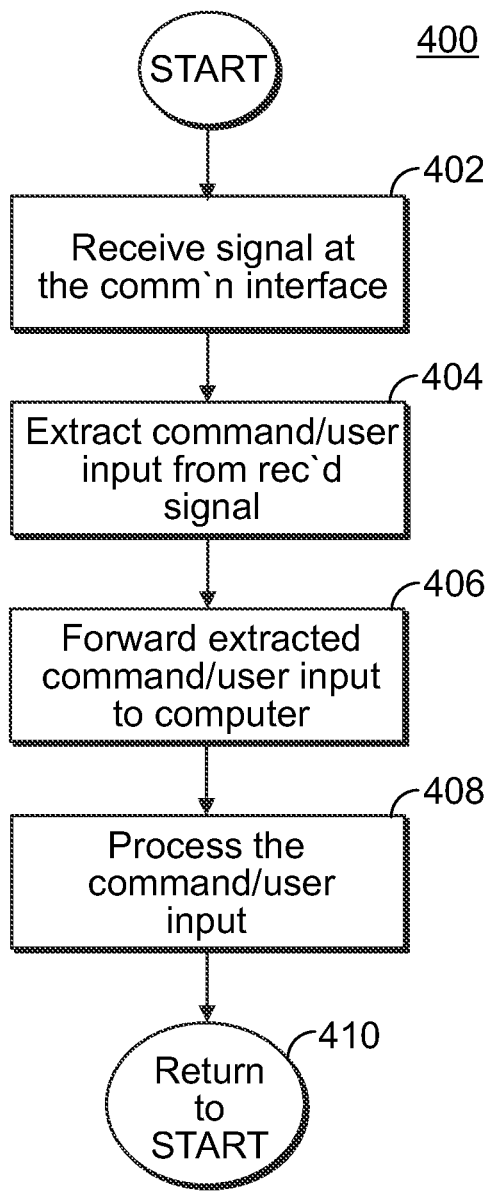
FIG. 4 is a flow chart depicting a method of controlling a vehicle information apparatus.

FIG. 4 is a flowchart of a method of controlling a vehicle information display apparatus. The method finds particular application to the apparatus depicted in FIG. 3.

As a first step, the method includes receiving signals that the communications interface 310. Such signals can include those from the aforementioned portable input device 314, however, they can also include signals from other devices. Such other devices can include but are not limited to a global positioning system device, a text-to-speech converter, a voice recognition engine in a smart phone or other wireless device, a camera, an accelerometer, a gyroscope, a light sensor, a compass and a near field communications sensor. These input signals can be from distinct devices, or all coming from a single device.

Upon receipt of a signal, such as the radio frequency signal 316 at the communications interface 310, the communications interface 310 extracts a command or user input from the received signal as shown in step 404. At step 406 an extracted command or user input is forwarded to the computer 406 for execution as if the sensors were designed into the vehicle during production.

As stated above, the computer 302 executes program instructions stored in the memory device 306 by which it receives commands or inputs from the user interface 310 and processes them or executes them accordingly.

In step 408 of FIG. 4, the method depicts the processing of a command or user input. Such processing would include of course the display of map information from a GPS system on the display device 220. It would also include the display of turn by turn directions.

In other embodiments, wherein the portable device 314 is another type of interface, program instructions in the memory 306 would cause the computer 302 to display images or video from a camera; text after being converted from handwriting by either the portable device 314 or software in the memory 306.

In other embodiments, the input device 314 can include voice recognition capability provided by a smart phone, an accelerometer, a gyroscope, a light sensor, a compass or near field communications sensor. Information from such sensors that is received by the communications interface 310 is processed by the computer 302 and appropriately displayed or activated on the display device 220.

In a preferred embodiment, the communications interface 310 is comprised of a radio frequency transceiver configured to transmit and receive signals in the WI-FI spectrum, Bluetooth or other short-range communications system. In an alternate embodiment, the communications interface 310 provides a universal serial bus or USB interface. Still other embodiments include the communications interface that provides Ethernet, media-oriented systems transport or most communications, RS232, Fire Wire and HDMI or High-Definition Multi-media Interface.

In yet another embodiment, the communications interface 310 receives an audio signal as either a digital signal such as a MP3 file, an analogue signal or a digital representation thereof. The analogue signal once provided to the computer 302 is processed by the computer 302 into an audible signal and output from a speaker 338.

Referring again to both FIG. 2 and FIG. 3, one or more cradles 336, which are connected to interior panels couple an input device electrically to the computer 302 and mechanically to the vehicle 100. Cradles 336 for cellular telephones are well-known in the art. Further description of them is omitted for brevity.

In another embodiment shown in FIG. 2, a second cradle 336, substantially identical to the first cradle 336 is provided by which two smart phones or two other input devices can provide inputs to the computer 302 via the communications interface 310. In such an embodiment the two input devices in the two cradles 336 can both effectuate control of a program running on the computer from programs stored in memory device 306. An example of such a program would be a game, a navigations system or an audio playback device by which two or more passengers could interact with each other via the communications interface 310.

The foregoing description is for purposes of illustration only. The true scope of the invention is set forth in the appurtenant claims.

What is claimed is:

1. An apparatus for a vehicle, the apparatus comprising:
    a pressure sensitive display device attached to the vehicle;
    a computer operatively coupled to the pressure sensitive display device;
    a communications interface coupled to the computer, the communications interface configured to provide to the computer, information-bearing signals received from a portable input device comprising a capacitive touch screen;
    a memory device coupled to the computer and storing program instructions executable by the computer, the program instructions causing the computer to accept information-bearing signals from the communications interface, interpret a command entered at a capacitive touch screen and actuate the pressure sensitive display device responsive to the command entered at the capacitive touch screen; and
    wherein the communications interface is additionally configured to receive information from a sensor coupled to the portable input device, and wherein program instructions in the memory device cause the processor to process received sensor information.

2. The apparatus of claim 1, wherein the communications interface is a radio frequency receiver configured to receive short-range radio frequency signals from the portable input device.

3. The apparatus of claim 2, wherein the radio frequency receiver is configured to receive radio frequency signals compliant with at least one of:

Bluetooth communications standard and derivatives thereof; and

I.E.E.E. 802.1xxx communications standards and derivatives thereof.

4. The apparatus of claim 1, wherein the communications interface is at least one of:
   a universal serial bus (USB) interface;
   an Ethernet interface;
   an optical media oriented systems transport MOST communications interface;
   an RS-232 communications interface; and
   a fire wire interface.

5. The apparatus of claim 1, further comprising a controller area network operatively coupled to the computer and to at least one vehicle component controlled by the computer, wherein control signals for a vehicle component coupled to the controller area network and which are received by the communications interface, are transmitted from the computer, onto the controller area network and then sent to the vehicle component.

6. The apparatus of claim 1, wherein program instructions in the memory device cause the computer to recognize hand writing on the capacitive touch screen and to display text converted from recognized handwriting.

7. The apparatus of claim 1, wherein the sensor information is comprised of information from at least one of:
   a global positioning system (GPS) apparatus;
   a text-to-speech converter;
   a voice recognition engine;
   a camera;
   an accelerometer;
   a gyroscope;
   a microphone input;
   a light sensor;
   a compass; and
   a near field communication sensor.

8. The apparatus of claim 1 further comprising an audio speaker coupled to the computer and wherein the communications interface is configured to receive signals that represent audio, the communications interface being additionally configured to provide a received audio signal to the computer, program instructions in the memory device causing the computer to generate audible audio signals from the speaker using the received audio signal.

9. The apparatus of claim 1, wherein the communications interface comprises a first cradle configured to couple a first smart phone to the computer, when the first smart phone is in the first cradle, the communications interface further comprising a second cradle configured to couple a second smart phone to the computer when the second smart phone is in the second cradle, both the first and second smart phones being able to control the computer.

10. A method of controlling a vehicular information apparatus having a pressure-sensitive display device coupled to a computer, the computer being coupled to a memory device, the computer controlling the display of images on the pressure-sensitive display device responsive to program instructions in the memory device and responsive to a signal the computer receives from a first communications interface configured to be capable of receiving information-bearing signals from a portable input device inside the vehicle, the portable input device having a capacitive touch screen, the method comprising the steps of:
   receiving an information-bearing signal at the first communications interface, which originated from a tactile input to the portable input device having a capacitive touch screen;
   forwarding the information-bearing signal to the computer;
   processing the information-bearing signal responsive to program instructions stored in the memory device to interpret the tactile input to the portable input device for display on the pressure sensitive display;
   transmitting control signals received from the first communications interface onto a network operatively coupled between the computer and at least one vehicle component that is controlled by the computer; and
   wherein the vehicular information apparatus comprises a second communications interface, the method further comprising:
   receiving a second information-bearing signal at the second communications interface;
   forwarding the second information-bearing signal to the computer; and
   processing the first information-bearing signal by the computer and processing the second information-bearing signal by the computer.

11. The method of claim 10, wherein processing an information-bearing signal comprises transmitting control signals received from the first communication interface onto a controller area network.

12. The method of claim 11, wherein the step of receiving an information-bearing signal at the first communications interface comprises receiving a signal from at least one of:
   a universal serial bus (USB);
   a universal serial bus (USB) interface;
   an Ethernet interface;
   a media oriented systems transport MOST communications interface;
   an RS-232 communications interface;
   a High-Definition Multimedia Interface (HDMI); and
   a fire wire interface.

13. The method of claim 11, wherein the step of receiving an information-bearing signal at the first communications interface comprises receiving the signal from a portable radio frequency communications device in a cradle for the portable radio frequency communications device.

14. The method of claim 10, wherein the step of receiving an information-bearing signal at the first communications interface comprises receiving a signal representing an input to a touch-sensitive input panel and wherein the step of processing the information-bearing signal responsive to program instructions stored in the memory device is comprised of displaying on the pressure-sensitive display device a representation of the input to the touch-sensitive input panel.

15. The method of claim 10, wherein the step of receiving an information-bearing signal at the first communications interface comprises at least one of:
   receiving navigation information;
   receiving an MP3 file and in response thereto, generating audio signals from a speaker coupled to the computer using the received MP3 file;
   receiving a signal from an accelerometer;
   receiving a signal from a near-field communications device;
   receiving a signal from a compass;
   receiving a signal from a camera;
   receiving a signal from a text-to-speech converter;
   receiving a signal from voice recognition engine.

16. An information apparatus for a vehicle, the information apparatus comprising:
   a display device attached to the vehicle;
   a computer coupled to the display device;

a first communications interface for a first device having a first capacitive touch screen and which is configured to output signals carrying information that represent an input to the first capacitive touch screen, the first communications interface being coupled to the computer and providing to the computer, information-bearing signals representing tactile inputs to first capacitive touch screen;

a second communications interface for a second device having a second capacitive touch screen and which is configured to output signals carrying information that represent an input to the second capacitive touch screen, the second communications interface being coupled to the computer and providing to the computer, information-bearing signals representing tactile inputs to second capacitive touch screen; and a memory device coupled to the computer and storing program instructions executable by the computer, when executed, the program instructions causing the computer to accept information-bearing signals from the first and second communications interfaces and display an image on the display device responsive to the tactile inputs to the first and second capacitive touch screens.

* * * * *